United States Patent
Takahashi et al.

[11] Patent Number: 6,121,757
[45] Date of Patent: Sep. 19, 2000

[54] CONTROL DEVICE FOR MOTOR VEHICLE USE CHARGING GENERATOR

[75] Inventors: Naoyuki Takahashi, Mito; Sakae Hikita, Hitachinaka; Shuuichi Kokubun, Naka-machi, all of Japan

[73] Assignees: Hitachi, Ltd., Tokyo; Hitachi Car Engineering Co., Ltd., Hitachinaka, both of Japan

[21] Appl. No.: 09/248,995

[22] Filed: Feb. 12, 1999

[30] Foreign Application Priority Data

Feb. 12, 1998 [JP] Japan .................................. 10-029501

[51] Int. Cl.[7] ...................................................... H02P 9/14
[52] U.S. Cl. .................... 322/28; 322/27; 322/59; 322/7
[58] Field of Search ........................... 322/7, 8, 18, 25, 322/27, 28, 59

[56] References Cited

U.S. PATENT DOCUMENTS

| | | | |
|---|---|---|---|
| 5,144,220 | 9/1992 | Iwatani et al. | 322/28 |
| 5,262,711 | 11/1993 | Mori et al. | 322/28 |
| 5,444,354 | 8/1995 | Takahashi et al. | 322/28 |
| 5,497,069 | 3/1996 | Shriver et al. | 322/19 |
| 5,561,363 | 10/1996 | Mashino et al. | 322/25 |
| 5,637,985 | 6/1997 | Kakizaki et al. | 322/28 |
| 5,754,030 | 5/1998 | Maehara et al. | 322/19 |
| 5,754,031 | 5/1998 | Kanazawa et al. | 322/28 |
| 5,880,577 | 3/1999 | Aoyama et al. | 322/29 |
| 5,982,155 | 11/1999 | Rechdan et al. | 322/36 |

FOREIGN PATENT DOCUMENTS

6-54464 of 1994 Japan .

*Primary Examiner*—Nicholas Ponomarenko
*Attorney, Agent, or Firm*—Evenson, McKeown, Edwards & Lenahan, P.L.L.C.

[57] ABSTRACT

A control device for a motor vehicle electric generator takes into account the relationship between field currents flowing through field windings of charging generators having different generation powers and output currents. The field current is increased once and instantly at the time of loading but prior to suppressing the increasing speed of the field current. The amount of the increase of the field current is controlled to be proportional to the field current before the loading. The control device according to the invention can be used for charging generators having different power generation capacities, and the battery voltage drops at the moment when switching in a motor vehicle electric load are reduced to substantially the same level.

5 Claims, 6 Drawing Sheets

CONTROL DEVICE FOR MOTOR VEHICLE USE CHARGING GENERATOR

BACKGROUND AND SUMMARY OF THE INVENTION

This application claims the priority of Japanese patent document 10 029501, filed Feb. 12, 1998, the disclosure of which is expressly incorporated by reference herein.

The present invention relates to a control device for for use in a motor vehicle generator and, more specifically, to a control device for an electric generator which is suitable for being driven by an internal combustion engine having a large load variation.

Automobiles are provided with a battery which is designed to supply an electric power to electric loads such as lamps, actuators and the like and an electric generator for charging the battery. Ordinarily, the generator of this sort is an inductor type AC generator in which a field winding is excited and is rotated by the driving torque caused by an engine. A battery charging voltage generated via the excitation of the field winding is controlled through a voltage regulator so as to maintain the same at a predetermined value.

However, when the electric load increases (such as by turning on the lamp switches and the like), it is in general necessary to correspondingly increase the amount of electric power to be generated; therefore, the current flowing through the field winding of the generator is also controlled increase rapidly. As a result, since the work load of the generator increases, the torque generated by the generator is also increased. Accordingly, the balance between the torque generated by the generator and the driving torque generated by the engine is lost, the engine rpm drops correspondingly to the increased fraction of the torque generated by the generator, and in the worst case the engine may stall. Particularly, during an idling condition in which the engine is controlled so as to maintain a predetermined rpm, while keeping a balance between the engine drive torque and the torque and the torque generated through the generator caused by auxiliaries including the generator, it is undesirable to experience a rapid torque variation which exceeds the response speed of the rotation control.

In order to suppress such phenomenon, a so called gradual excitation control has been proposed which suppresses a rapid rise of the field current flowing through the field winding, when a large electric load is suddenly applied to the generator. In this manner, rapid variations of the torque generated through the generator with regard to that of the engine can be prevented.

In the above gradual excitation control, the current to be generated is gradually increased and the generator cannot supply a necessary current immediately in response to an electric load change; therefore, the battery supplies a current to the load to supplement the shortage. If the current thus drawn out from the battery is large, a battery voltage drop is caused. Such drop is experienced especially at night when a head light, back lamps for a meter panel and an in-cabin lighting are used. In that case, when cyclical loads such as a hazard light and a wiper are turned on, resulting brightness fluctuation due to the battery voltage variation can be uncomfortable to the driver.

A counter measure for preventing such battery voltage drop caused by the gradual excitation control is disclosed in Japanese patent document JP-A-6-54464 (1994). There, at the moment when a load is turned on and prior to activating the gradual excitation control, the exciting current flowing through the field winding is once increased immediately to a predetermined amount, so as to supply to the electric load a generated current (for example amount 10 A) a level which causes no problem in connection with a rapid increase of the torque generated through the generator with regard to the engine torque. Thereafter, the gradual excitation control is started and the output current of the generator is gradually increased, so that the battery voltage drop immediately after the loading can be decreased.

In the above mentioned prior art JP-A-6-54464 (1994), at the moment when switching in an electric load (but prior to starting the gradual excitation control), the excitation current is immediately increased by a predetermined amount. However, when determining the increased amount of the excitation current, the characteristics of the concerned generator were not taken into account. For this reason, if a common control device is used for respective generators having different power generation capacities, an output current which is large relative to the predetermined excitation current (in other words, a large amplification rate by the generator) is obtained for a generator having a large power generation capacity. Therefore, after having increased the generation current (for example by about 10 A), by increasing the excitation current once by a predetermined amount at the moment when an electric load is switched in, the control device operates so as to gradually increase the generation current through the gradual excitation control. However, for a generator having a small power generation capacity, the output current is small relative to the excitation current. Thus, when the excitation current is increased once by the same predetermined amount as the generator having a large power generation capacity, the immediately generation current response is relatively small (for example about 2 A) in comparison with that of the generator having a large power generation capacity.

An object of the present invention is to provide a control device for an electric generator in a vehicle which reduces the battery voltage drop even for a generator having a small power generation capacity to a level comparable with that for a generator having a large power generation capacity.

An object of the present invention is achieved by a control device for a motor vehicle generator of the type which is driven by an engine for charging a battery by rectification of its output, and has a voltage regulator for maintaining the charging voltage of the battery at a constant level, and a gradual excitation control device which gradually increases the generation current of the generator after an electric load is switched in. According to the invention, the amount of increase of control current of a power switch for controlling the excitation current of the generator at a moment immediately after switching in the electric load, but prior to the activation of the gradual excitation control means, is adjusted depending on power generation conditions of the generator.

Preferably, according to the present invention, the amount of increase of the control current of the power switch for controlling the excitation current of the generator is adjusted depending on the generation current of the generator in such a manner that when the generation current is large, the amount of the increase is enlarged, and when the generation current is small, the amount of increase is reduced.

Further preferably, according to the present invention, the amount of increase of the control current of the power switch for controlling the excitation current is adjusted to a value proportionate to the excitation current prior to switching in the electric load.

Still a further object of the present invention is achieved by a control device for a motor vehicle electric generator of the type described above, which has a circuit the generates an integration output of a value determined by adding a deviation signal output (obtained by comparing the output voltage of the battery or the generator with a predetermined set voltage) to a predetermined amount of voltage, and selects the lower of the deviation signal output and the integration output as a control signal for controlling the excitation current of the generator. The predetermined amount of voltage to be added to the deviation signal output is controlled to be proportional to the value of the deviation signal output.

The object of the present invention is achieved by a control device for a motor vehicle electric generator comprising a field winding which is driven by rotation of an engine and generates rotating magnetic field; an armature winding which receives the rotating magnetic field, generates current and charges a battery via a rectifier; a voltage detecting circuit which detects the voltage of the battery or of the rectifier; a setting voltage circuit which generates a reference voltage; a deviation signal output circuit which receives the output voltage of the voltage detecting circuit and the reference voltage of the setting voltage circuit as the inputs and outputs a deviation signal; an adder circuit which adds a voltage proportional to the output voltage from the deviation signal output circuit to the output voltage of the deviation signal output circuit; a sawtooth wave generating circuit which outputs a voltage having rising and falling waveform within a predetermined voltage region at a preset cycle; an integration circuit which responds to the output of the adder circuit with a time constant which is longer than that of the field winding; and a comparator which receives as a first input thereof the lower of the deviation signal and the output voltage of the integration circuit, and as a second input thereof the output voltage of the sawtooth wave generating circuit as its inputs, wherein the current supplied to the field winding is controlled by the output from the comparator.

Other objects, advantages and novel features of the present invention will become apparent from the following detailed description of the invention when considered in conjunction with the accompanying drawings.

DETAILED DESCRIPTION OF THE PREFERRED EMBODIMENT

An embodiment according to the present invention will be explained with reference to FIGS. 1 through 4.

Figure 1:
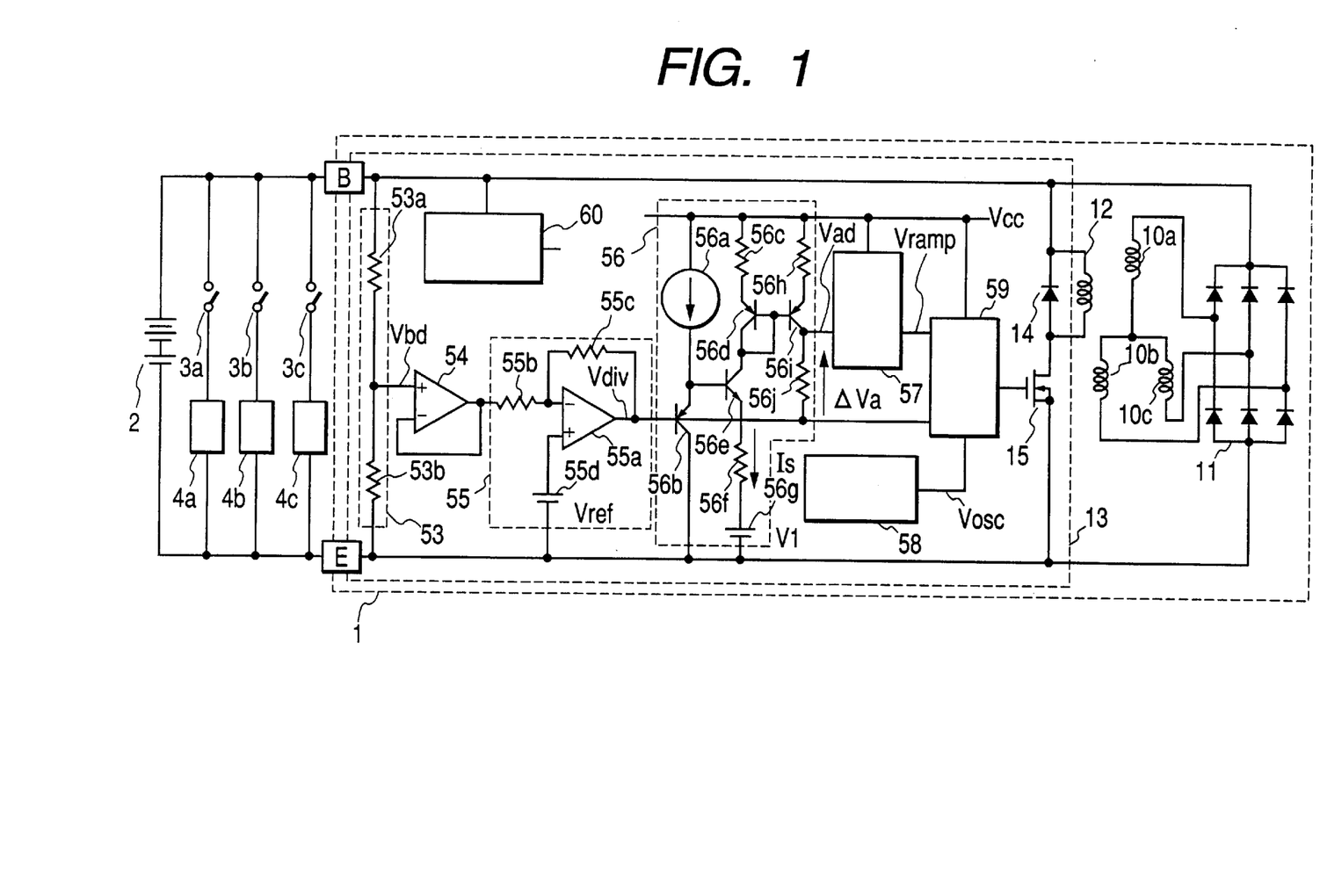
FIG. 1 is a partially schematic circuit diagram of a motor vehicle generator and a control device representing one embodiment according to the present invention.

Numeral 1 in FIG. 1 shows an electric generator for an automobile, which is constituted by three phase armature windings 10a, 10b and 10c, a rectifier 11 which converts the AC output from the three phase armature windings 10a, 10b and 10c into DC. A field winding 12 is rotated by an internal combustion engine (not shown) and supplies magnetic fluxes to the three phase armature windings 10a, 10b and 10c, and a voltage regulator 13 controls the field current flowing through the field winding 12.

The voltage regulator 13 is constituted by a flywheel diode 14, a power MOS transistor 15, a voltage detecting circuit 53, a buffer amplifier 54, a deviation signal outputting circuit 55, a voltage adder circuit 56, an integration circuit 57, a sawtooth wave generating circuit 58, a cmoparator 59 and a power source 60. The deviation signal outputting circuit 55 serves as an inverted amplifier circuit constituted by an amplifier 55a and resistors 55b and 55c.

An output terminal B of the generator 1 is connected to a battery 2 as well as to electric loads 4a, 4b and 4c such as a head light, a wiper and an air conditioner via switches 3a, 3b and 3c.

Details of the major block diagram circuits in FIG. 1 will be explained with reference to FIGS. 2 through 4.

Figure 2:
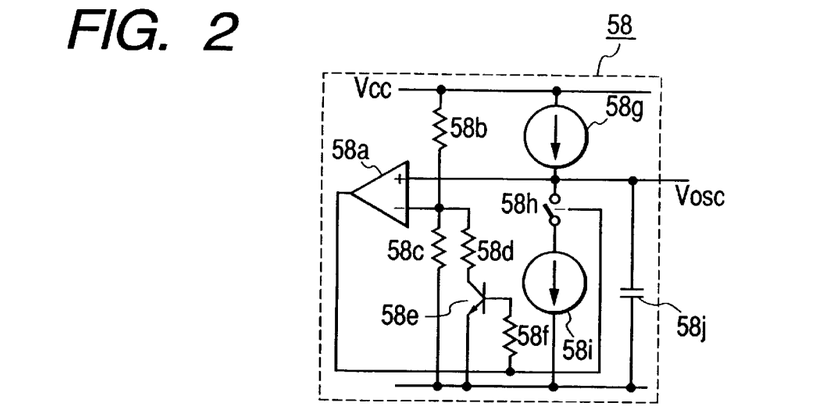
FIG. 2 is a detailed circuit diagram of the sawtooth wave generating circuit 58 shown in FIG. 1.

FIG. 2 is a detailed circuit diagram of the sawtooth wave generating circuit 58 shown in FIG. 1. When the output voltage of a comparator 58a therein is in a low level, a switch 58h is placed in a nonconductive state, thus a capacitor 58j is charged by a constant current source 58g. Further, at this moment an NPN transistor 58e is in a nonconductive state, therefore, the comparator 58a maintains the low level until the potential of the capacitor 58j reaches to a voltage VH determined by dividing the power source voltage VCC with resistors 58c and 58b. When the potential of the capacitor 58j exceeds the voltage VH, the output voltage of the comparator 58a moves to a high level to render the switch 58h conductive, thus the current from the constant current source 58g and the capacitor 58j flows into another constant current source 58i to discharge the capacitor 58j. Further, since the NPN transistor 58e is in a conductive state, the comparator 58a holds the high level until the potential of the capacitor 58j reaches a voltage VL determined by dividing the power source voltage VCC with parallel resistors 58c and 58d and the resistor 58b. Through repetition of the above operation, the potential of the capacitor 58j assumes a sawtooth waveform voltage Vosc. The above referred to voltages VH and VL and the cycle T of the sawtooth wave are expressed by the following equations:

$$VH=\{R58c/(R58b+R58c)\}\times VCC \quad (1)$$

$$VL=\{Rx/(Rb+Rx)\}\times VCC \quad (2)$$

wherein Rx=(Rc×Rd)/(Rc+Rd)

$$T=+ \quad (3)$$

Figure 3:
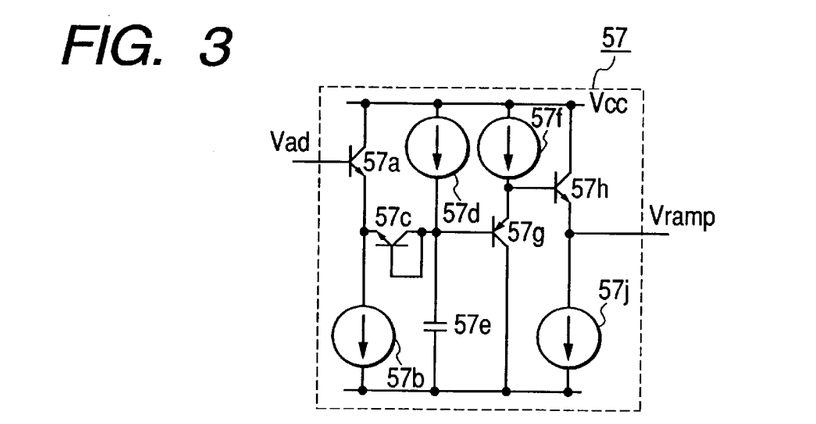
FIG. 3 is a detailed circuit diagram of the integration circuit 57 shown in FIG. 1.

FIG. 3 is a detailed circuit diagram of the integration circuit 57 shown in FIG. 1. The input voltage is connected to the base of an NPN transistor 57a which constitutes a diode switch together with an NPN transistor 57c. In the diode switch, the transistor whose base potential shows higher than that of the other is rendered conductive, while the transistor whose base potential shows lower is rendered nonconductive. For this reason, when the potential of a capacitor 57e is lower than the input voltage, the power source voltage VCC is supplied to a constant current source 57b via the collector-emitter of the transistor 57a, which is conductive. Thus, the capacitor 57e is charged by the current from a constant current source 57d. On the other hand, when the potential of the capacitor 57e is higher than the input voltage, NPN transistor 57c is conductive so that the current from the constant current source 57d and from the capacitor 57e is supplied to the constant current source 57b. Thus, the discharge current of the capacitor 57e is determined by the difference between the current of the constant current source 57d and the current of the constant current source 57b. Constant current sources 57f and 57j and transistors 57g and 57h constitute in combination a buffer circuit which prevents a leakage current of the capacitor charging and discharging current. With the above operation, an output voltage which responds to the input voltage with a time constant of the integration circuit can be obtained. The charging time Tc of the output voltage which responds to the voltage variation amount ΔV of the input voltage, and the discharging time Td are expressed by the following equations:

$$Tc = (C57e \times \Delta V)/I57d \qquad (4)$$

$$Td = (C57e \times \Delta V)/(I57b - I57d) \qquad (5)$$

Figure 4:
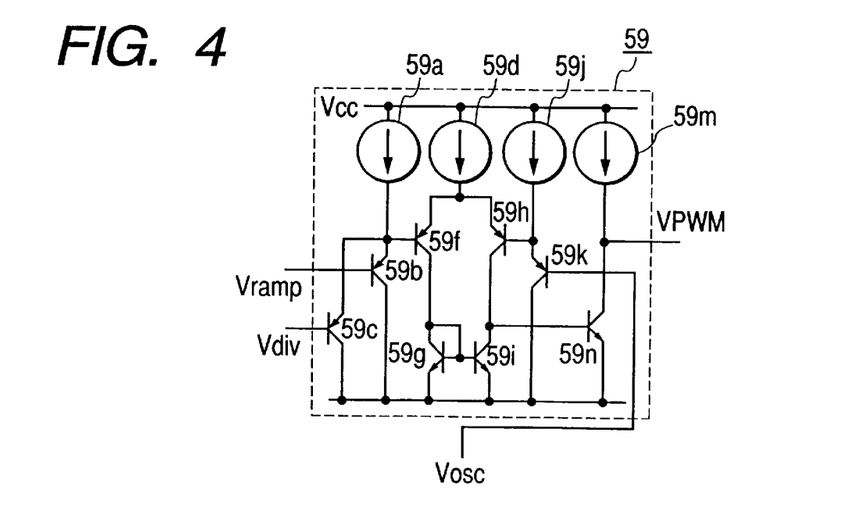
FIG. 4 is a detailed circuit diagram of the comparator 59 shown in FIG. 1.

FIG. 4 is a detailed circuit diagram of the comparator 59 shown in FIG. 1. Constant current sources 59d and 59m and transistors 59f, 59g, 59h, 59i and 59n in combination constitute the comparator 59, with the base of the PNP transistor 59f serving as the minus input thereof, the base of the PNP transistor 59h serving as the plus input thereof and the collector of the transistor 59n serves as the output thereof. Further, inputs Vramp and Vdiv are connected to the respective bases of PNP transistors 59b and 59c which constitute in combination a diode switch. In the diode switch, the transistor whose base potential shows lower than that of the other is rendered conductive, while the transistor whose base potential shows higher is rendered nonconductive. For this reason, the base potential of the PNP transistor 59f (the minus input of the comparator) assumes a value determined by adding the lower of the base voltages of the transistors 59b and 59c to the base-emitter voltage the transistor. Further, the other input Vosc is the transistor connected to the base of a PNP transistor 59k, so that the potential determined by adding the input voltage Vosc to the base-emitter voltage thereof constitutes plus input of the comparator. With the above operation, the comparator 59 compares the lower of the input voltages Vramp and Vdiv with the voltage Vosc, and outputs the result. Because the voltage Vosc has a sawtooth waveform, a pulse width modulated waveform appear at the output Vpwm.

In the voltage regulator 13 shown in FIG. 1, the power source circuit 60 supplies a power source voltage VCC to other circuits. The buffer amplifier 54 outputs the voltage Vbd determined by dividing the generation 53a and 53b in the voltage detecting circuit 35. The deviation signal output circuit 55 is an inverted amplifier circuit constituted by the amplifier 55a and the resistors 55b and 55c, and outputs a deviation voltage signal indicative of the difference between the output Vbd from the buffer reference 54 and the reference voltage Vref. The deviation signal voltage Vdiv is expressed by the following equation:

$$Vdiv = \{(Vref - Vbd) \times (R55c/R55b)\} + Vref \qquad (6)$$

The deviation signal from the deviation signal output circuit 55 is input to the voltage adder circuit 56 which in turn outputs a voltage Vad determined by adding an additional voltage Δva to the deviation signal voltage. A buffer circuit constituted by a constant current source 56a and transistors 56b and 56e in the voltage adder circuit 56 operates to equal the emitter voltage of the transistor 56e equal to the deviation signal voltage Vdiv.

Accordingly, a current Is, determined by a potential different between the deviation signal voltage Vdiv and the voltage of a power source 56g, flows through resistor 56f. The current Is flows from the power source voltage VCC to the power source 56g through resistor 56c, the emitter-collector of a transistor 56d, the collector-emitter of the transistor 56e and a resistor 56f.

Further, since the emitter size of a transistor 56i is formed as same as that of the transistor 56d, the bases thereof are connected in common and the resistance values of the resistors 56c and 56h are the same, a current equal to the above current Is flows from the power source VCC to the deviation signal output line through the emitter-collector of the transistor 56i and a resistor 56j. Based on the above operation, the adding voltage ΔVa is calculated according to the following equation:

$$\Delta va = (Vdiv - V1) \times (R56j/R56f) \qquad (7)$$

Figure 9:
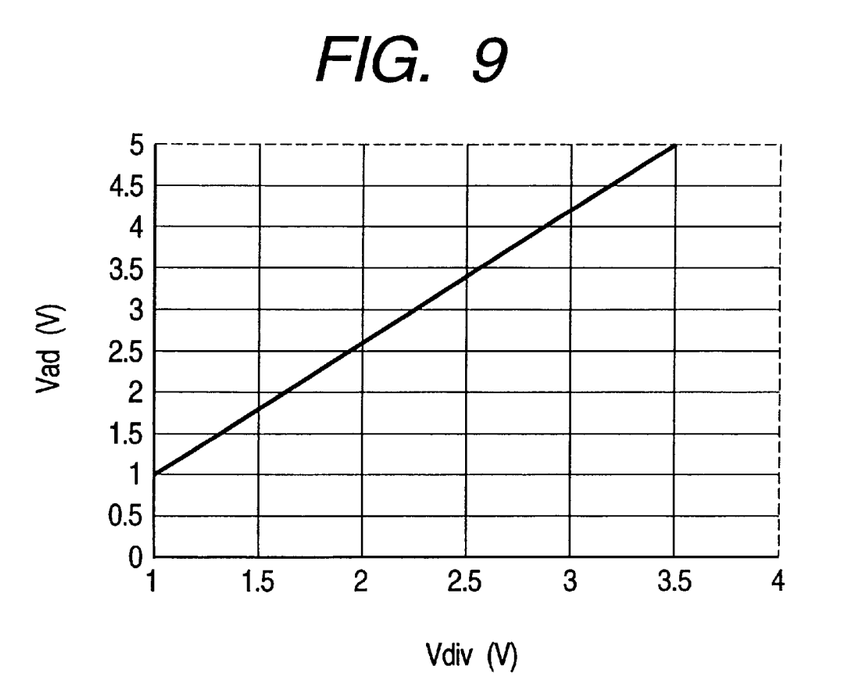
FIG. 9 is an output characteristic diagram of the voltage adder circuit 56 shown in FIG. 1.

The output voltage Vad characteristic of the voltage adder circuit 56 with respect to the deviation signal voltage Vdiv (when VCC=5V, V1=1V, R56j=30 KΩ, R56f=50 KΩ) is illustrated in FIG. 9.

The above output voltage Vad of the voltage adder circuit 56 is further inputted into the integration circuit 57 which is designated to respond to the deviation signal voltage with a larger time constant of the field winding 12. The comparator 59 compares the lower of the output voltage Vramp from the integration circuit 57 and the deviation signal voltage Vdiv, with the output voltage of the sawtooth wave generating circuit 58 (which varies within a predetermined voltage range at a constant cycle) and outputs a comparison result as a pulse width modulation wave. The latter is input to a power MOS transistor 15 connected in series with winding 12.

Figure 5:
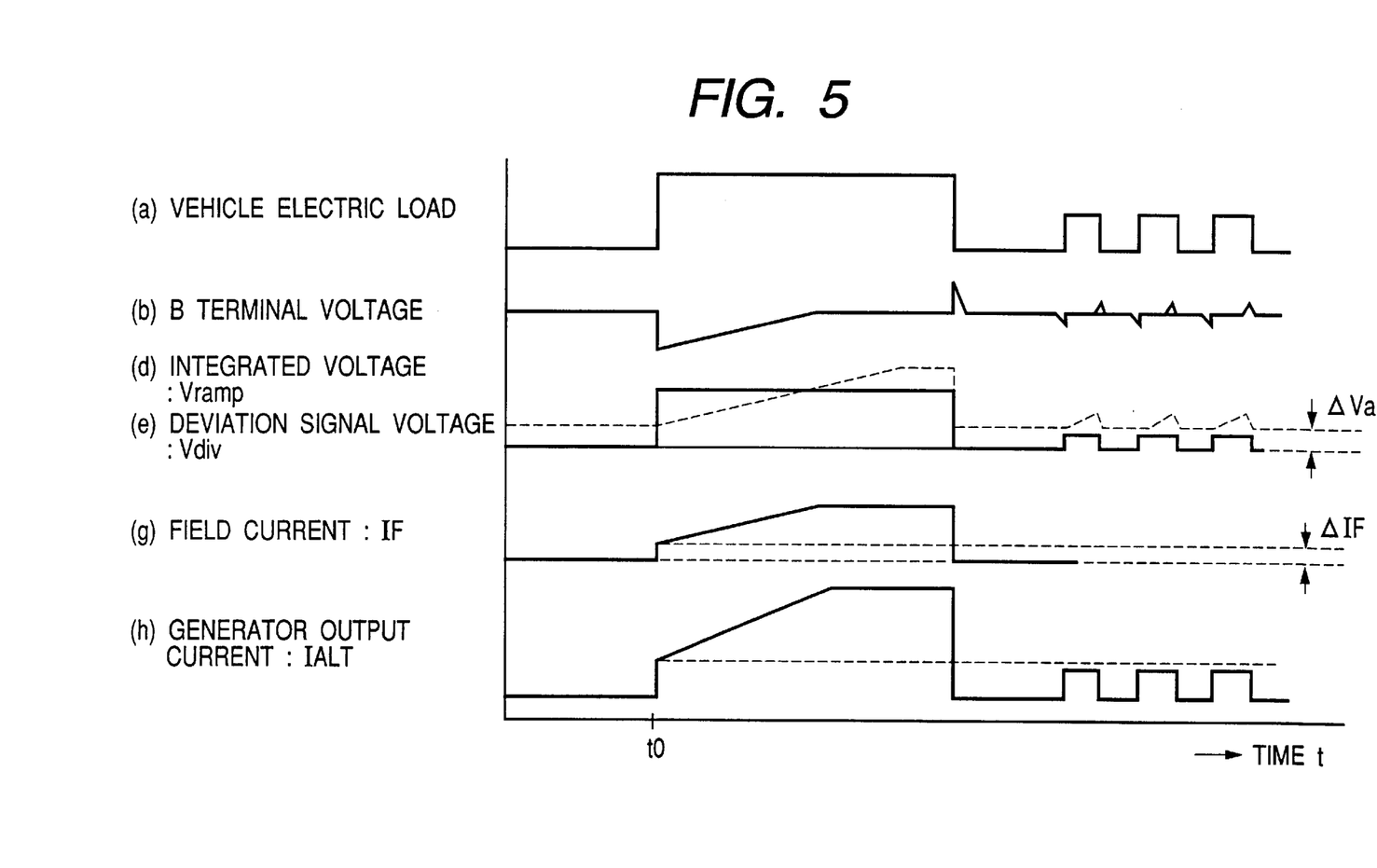
FIG. 5 depicts operation waveforms at respective terminals including ones at the electric load in the circuit diagram shown in FIG. 1.

Now, responses of voltage signals at respective output terminals during a steady state, and at the time when a load is switched in, are explained with reference to (a) through (h) in FIG. 5. During a steady state where the terminal voltage (b) in FIG. 5 of the battery 2 is stabilized, voltage Vdiv (e) in FIG. 5 representing the output of the deviation signal output circuit 55 stabilizes. Thus, the output voltage Vad of the voltage adder circuit 56 is also stabilized at a value determined by adding the predetermined value ΔVa to the deviation signal. Accordingly, the input voltage (Vdiv+ΔVa) of the integration circuit 57 and the integrated voltage Vramp (b) in FIG. 5 are kept at an equal value. Further, the power MOS transistor 15 is controlled the result of a comparison of the lower of the integrated voltage Vramp (d) in FIG. 5 (representing the output voltage of the output circuit 55), with the output voltage of the sawtooth wave generating circuit 58. For this reason, during the steady state the field current IF is resultantly controlled by the deviation signal voltage Vdiv (e) in FIG. 5.

At time t0 when a motor vehicle electric load having a large capacity is switched in as (a) in FIG. 5 and the terminal voltage of the battery 2 drops as shown in (b) in FIG. 5, the deviation signal voltage Vdiv representing the output of the deviation signal output circuit 55 immediately increases as (e) in FIG. 5. Therefore, the voltage adder circuit 56 also outputs immediately a value determined by adding ΔVa to the deviation signal voltage.

In this case, the output voltage of the integration circuit 57 rises with the time constant of the integration circuit 57 until the voltage thereof during the steady state equals the output voltage of the voltage adder circuit 56. On the other hand, since the deviation signal voltage Vdiv increases abruptly in response to the load switching in FIG. 5(e), the power MOS transistor 15 is controlled by the integrated output Vramp representing the output of the integration circuit 57 (FIG. 5(d)), and the field current IF increases slowly (FIG. 5(g)).

Figure 6:
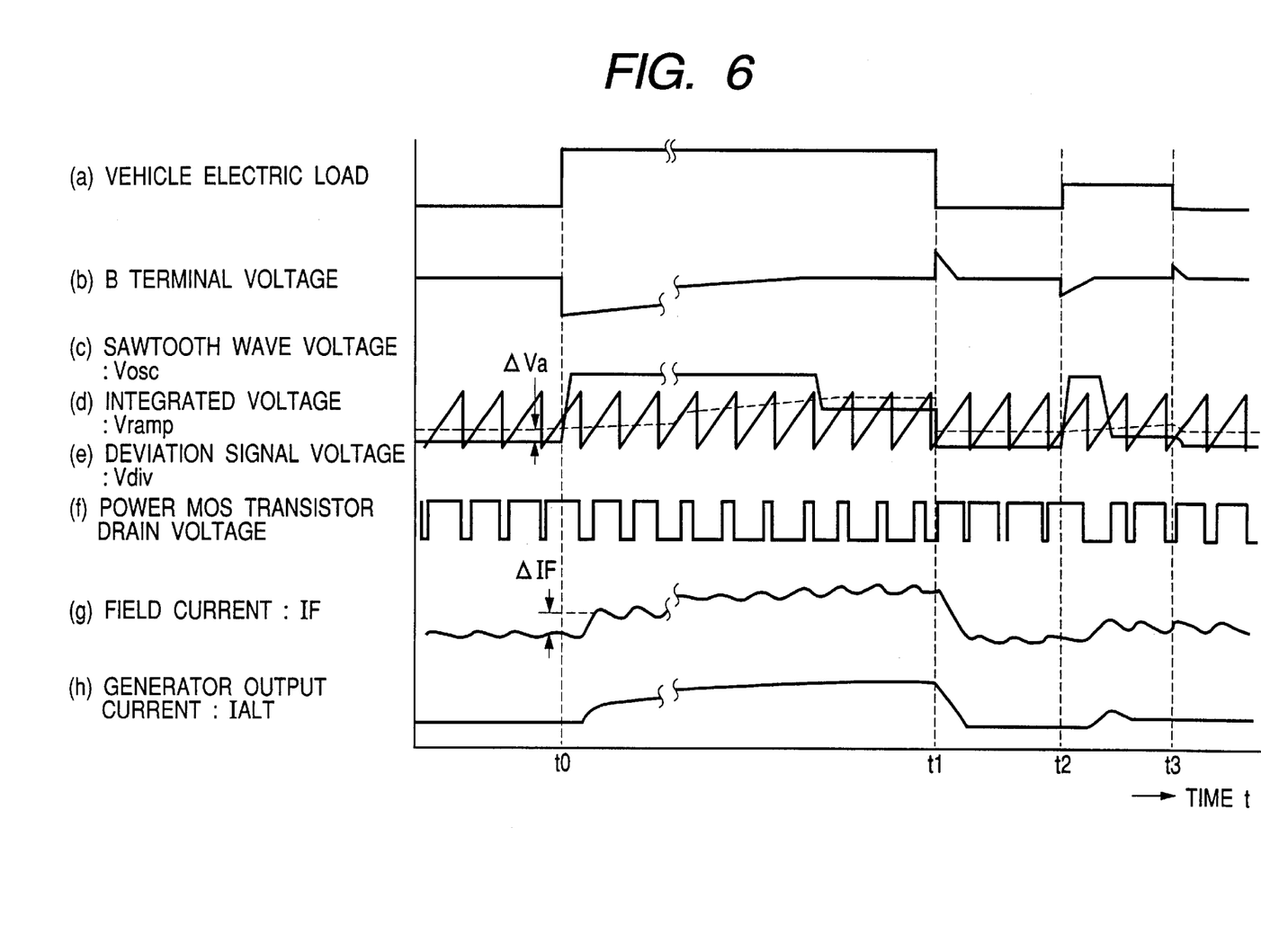
FIG. 6 shows the waveforms of FIG. 5 on an expanded time scale.

In FIG. 6 in which the time scale in FIG. 5 is extended, the variation of on duty of the power MOS transistor 15 at the time of the load switching-in and interruption thereof, caused by the sawtooth wave voltage Vosc output from the sawtooth wave generating circuit 58 (FIG. 6(c)), the integrated output Vramp of the integration circuit 57 (FIG. 6(d)) and the deviation signal voltage output Vdiv of the deviation signal output circuit 55 (FIG. 6(e)), is illustrated by the drain voltage of the power MOS transistor 15 (FIG. 6(f)). When the drain voltage is at a low level, the power MOS transistor 15 is in a conductive state, and when the drain voltage is at a high level, the power MOS transistor 15 is in an interrupted state. At time t0 when a motor vehicle electric load having a large capacity is switched in (FIG. 6(a)), the deviation signal voltage Vdiv immediately increases (FIG. 6(e)) and the sum of the predetermined voltage ΔVa and the deviation signal voltage Vdiv (FIG. 6(e)) through the voltage adder circuit 56 also rises immediately. The integrated output Vramp of the integration circuit 57 increases slowly from the value prior to switching-in of the load, with the time constant of the integration circuit 57 (FIG. 6(d)).

Herein, since the power MOS transistor 15 is driven by a signal determined by comparison of the lower of the deviation signal voltage on the other hand, with the output from the and the integrated sawtooth wave generating circuit 58 on the other, the on duty of the power MOS transistor 15 suddenly increases at the time t0 by the variation amount corresponding to the potential difference ΔVa, in that the potential difference between the deviation signal voltage and the integrated voltage during the steady state. Thereafter, it increases slowly with the time constant of the integration circuit 57. Subsequently, when at time t2 a load having a small capacity is switched in, since the current for the motor vehicle can be supplied by the instantaneously increased component of the generator output current due to the instantaneously increased component in the on duty of the power MOS transistor 15 caused by the potential difference ΔVa, no gradual control is activated. Further, since the instantaneously increased component of the generator output current is adjustable by the potential difference ΔVa, selection of the gradual controls can be performed depending on the capacity of the load.

Figure 7:
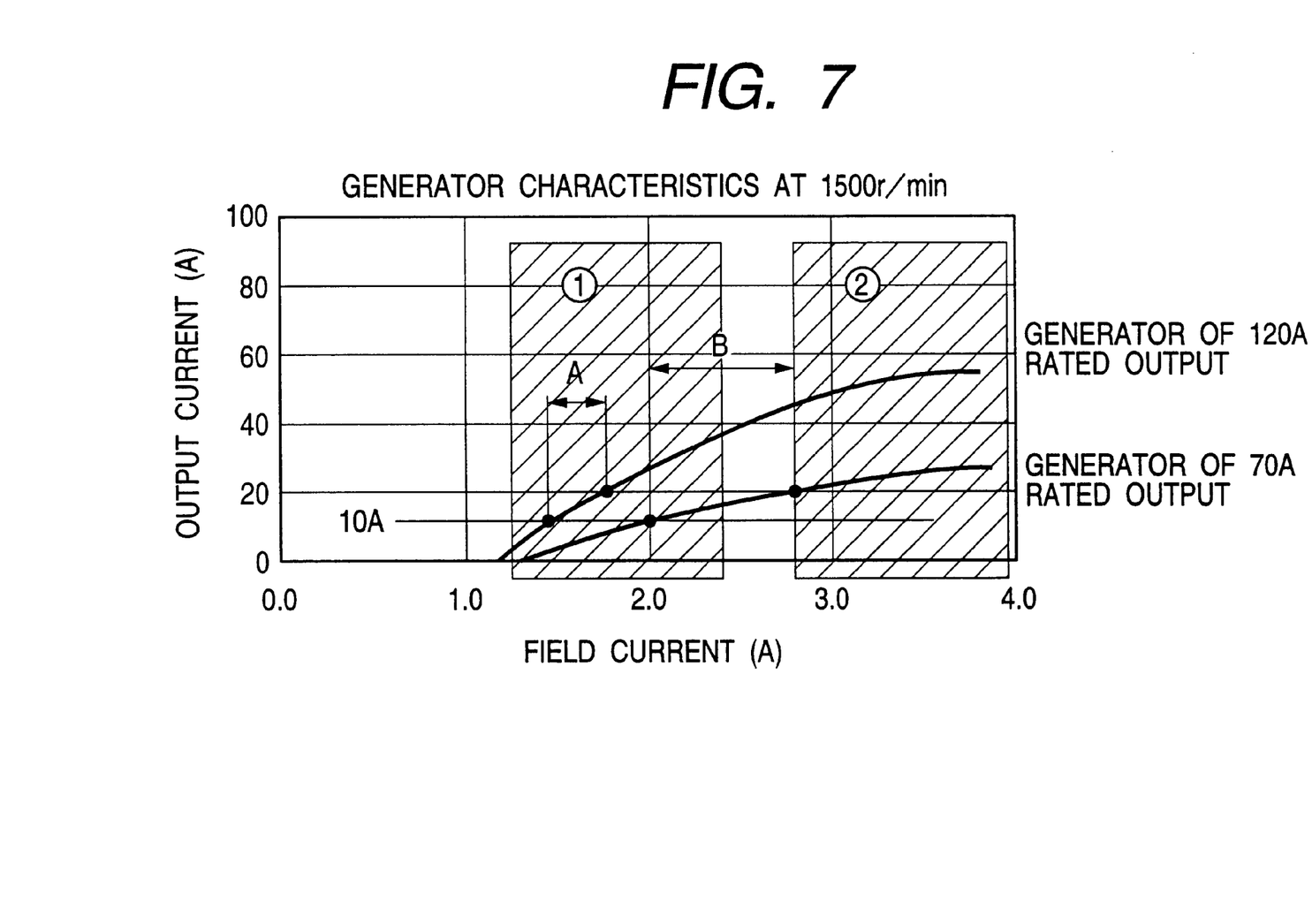
FIG. 7 shows a comparison of output characteristics of two different generators for explaining the principle of the present invention.

However, there are many generators having variety of output current capacities depending on capacities of such as the load and the battery mounted on the concerned motor vehicles. Generally, for popular cars having a small cubic capacity, electric generators having a small output current capacity, for example 70 A, are used; and for luxury cars having a large cubic capacity electric generators having a large output current capacity, for example 120 A, are used. FIG. 7 shows output characteristics of two electric generators having different generation current capacities. From FIG. 7, it will be appreciated that the amount by which it is necessary to increase the field current to once the generation current instantly by 10 A prior to starting the gradual excitation control, is not constant. Rather, it shows a characteristic in which the amount of the necessary increase becomes larger in proportion to the output current prior to switching in the load.

Further, for electric generators having different output capacities, the generation current of the respective generators varies significantly even when their field currents flowing through the respective field windings are identical; and the amounts of the increase of the field currents necessary for increasing the generation current from 10 A to 20 A are, for example, A and B as illustrated in FIG. 7.

Figure 8:
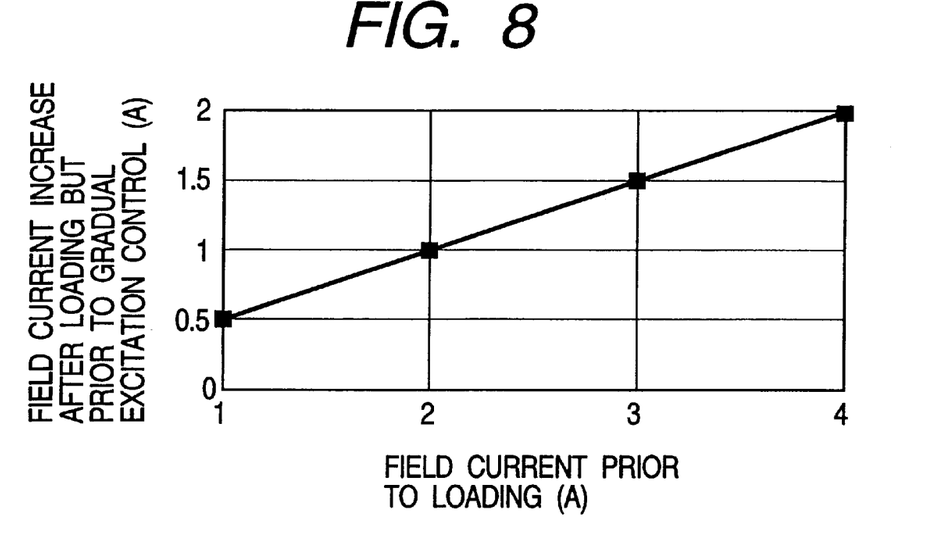
FIG. 8 is a characteristic diagram for determining the amount of increase of a field current of an electric generator.

According to the present invention, the generation current to be increased once and instantly prior to starting the gradual excitation control at the time of loading is controlled substantially constant, regardless of the generation current capacity of the concerned electric generator. FIG. 8 illustrates the relationship between the amount of increase of the field current which is necessary for increasing the generation current by 10 A immediately after loading for generators having different generation current capacities, and the field current before loading.

In a region for a small generation current (1) in FIG. 7, the output current shows a substantially proportional characteristic with respect to the field current. However, in a region for a large generation current (2) in FIG. 7, even if the field current is increased the rate of increase of the generation current is small in comparison with the region for a small generation current, because the generation current of the electric generator comes near to its saturation point. For this reason, when the amount of the increase in field current to be implemented once and instantly immediately after loading but prior to starting the gradual excitation control with respect to the field current before loading is set as illustrated in FIG. 8, the amount of the increase of the generation current to be implemented once and instantly prior to starting the gradual excitation control can be kept substantially constant regardless to the generation current condition of the electric generator.

Further, since a field current necessary for obtaining a certain output current decreases depending on the magnitude of the generation current capacity of the concerned electric generator, the amount of the increase in field current to be implemented once and instantly prior to starting the gradual excitation control is controlled to be smaller for generators having a larger generation current capacity. Accordingly, the increase of generation current to be implemented once and instantly prior to starting the gradual excitation control can be controlled substantially constant regardless to the generation current capacity of the concerned electric generator. Therefore, the added voltage ΔVa for the voltage adder circuit 56 is adjusted so as to achieve the characteristic amount to be increased of the field current as shown in FIG. 8.

Further, in the above embodiment, the characteristic of the electric generators is shown by a comparison of their rated outputs while keeping their rpms constant; however, the equivalent characteristic can be obtained through comparison of their rpms while keeping their rated outputs constant.

According to the present invention, when a common control device is used for generators having different generation power capacities, the output current of the electric generator responding once and instantly to a loading but prior to activating the gradual excitation control (which is designed to increase the generation current gradually) is kept substantially constant, thereby, the amount of voltage drop in the battery can be reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control device for a motor vehicle electric generator which is driven by an engine and which generates an electric current that is rectified and charges a battery, comprising:

a voltage regulator which is adapted to maintain a charging voltage of the battery at a constant level;

a gradual excitation control means which causes generation current output by the electric generator to increase gradually after an electric load is switched in; and a power switch for switching a control current to control an excitation current for exciting the charging generator;

wherein an amount of increase of the control current in the power switch at a moment immediately after switching in the electric load, but prior to activation of the gradual excitation control means varies as function of power generation conditions of the charging generator.

2. A control device for a motor vehicle electric generator according to claim 1, wherein the amount of increase of the control current of the power switch for controlling the excitation current is adjusted as a function of the generation current output by the charging generator so that when the generation current is large, the amount of said increase is made larger and when the generation current is small, the amount of said increase is reduced.

3. A control device for a motor vehicle electric generator according to claim 1, wherein the amount of increase of the control current of the power switch is adjusted in proportion to an excitation current value prior to switching in the electric load.

4. A control device for a motor vehicle electric generator which is driven by an engine and which generates an electric current that is rectified and charges a battery, comprising:

a voltage regulator which is adapted to maintain a charging voltage of the battery at a constant level;

a power switch for controlling an excitation current for exciting the electric generator;

a comparator adapted to receive and compare an output voltage of the battery or the electric generator and a predetermined reference voltage, said comparator generating a deviation signal indicative of a difference between said output voltage and said reference voltage;

a circuit coupled to said comparator, said circuit including a source for providing a voltage amount which is added to said deviation signal to generate a voltage value;

an integrator circuit coupled to receive said voltage value, which integrator circuit integrates said voltage value to generate an integration output signal; and a circuit which selects a lower one of the deviation signal and the integration output as a control signal which is coupled to control the power switch for controlling the excitation current;

wherein the voltage amount which is added to the deviation signal is adjusted to be proportional to a value of the deviation signal.

5. A control device for a motor vehicle electric generator having a field winding which is driven by rotation of an engine and generates rotating magnetic field, an armature winding which receives the rotating magnetic field, and generates current which charges a battery via a rectifier, said control device comprising:

a voltage detecting circuit adapted to detect voltage of the battery or the rectifier;

a setting voltage circuit which generates a reference voltage;

a deviation signal output circuit which receives an output voltage of the voltage detecting circuit and the reference voltage of the setting voltage circuit as the inputs and outputs a deviation signal;

an adder circuit which adds a voltage proportional to the output voltage from the deviation signal output circuit to the output voltage of the deviation signal output circuit;

a sawtooth wave generating circuit which outputs a voltage having a rising and falling waveform within a predetermined voltage range at a preset cycle;

an integration circuit which responds to the output of the adder circuit with a time constant which is longer than a time constant of the field winding; and a comparator which receives as a first input thereof the lower of the deviation signal and the output voltage of the integration circuit, and as a second input thereof the output voltage of the sawtooth wave generating circuit;

wherein the current supplied to the field winding is controlled by the output from the comparator.

* * * * *